Patented Feb. 17, 1925.

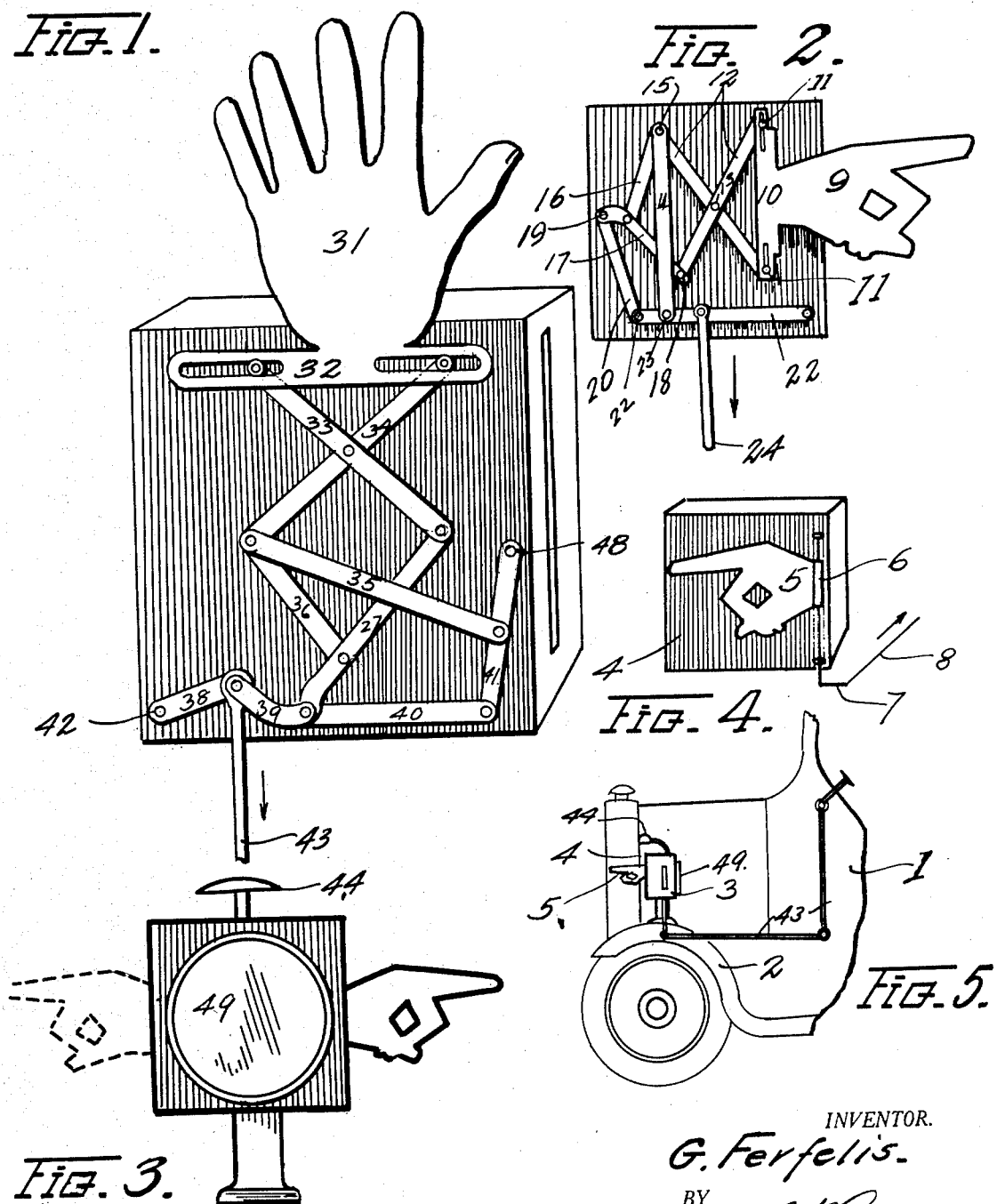

1,526,469

UNITED STATES PATENT OFFICE.

GEORGE FERFELIS, OF MANCHESTER, NEW HAMPSHIRE.

VEHICLE SIGNAL.

Application filed September 8, 1922, Serial No. 587,016. Renewed November 17, 1924.

*To all whom it may concern:*

Be it known that GEORGE FERFELIS, a citizen of the United States, residing at Manchester, in the county of Hillsborough and State of New Hampshire, has invented certain new and useful Improvements in Vehicle Signals, of which the following is a specification.

This invention refers to directional devices particularly for use with automotive vehicles used on the highways and city streets. It has among its objects to provide such a device that will indicate the direction in which the machine is about to travel in and the various movements that a machine is apt to make. Also to provide such a device with a definite indication of what the operator intends to do without requiring explanation or the so-called educating of the public beforehand, the indications of the device being self-explanatory. It also seeks to provide a device of the nature in question that will be susceptible to easy control by the operator and be compact and convenient to install and arrange. Other objects will become apparent as the invention is more fully set forth.

While a number of devices have been developed for the purpose of directional signalling for vehicles, such have in general many inherent objections. Many have written words that cannot be made out at any distance and generally confuse, and give a false sense of security to the operator of the vehicle using them. This invention provides a definite indication as close to the fundamental hand system of indicating used and required everywhere. It uses a hand to show a number of distinct movements of the vehicle, the hand is plainly evident and assumes a definite and always the same position. It is manipulated simply and does not interfere with the operator's operation of the vehicle and take up unnecessary attention on his part.

In the construction shown in the drawings:

Figure 1 is a view in perspective of a device embodying this invention, with a portion of the covers removed to show the interior construction or mechanism of the stop signal.

Figure 2 is a detail view of the mechanism and device, indicating the right hand movement position.

Figure 3 is a rear view of the device showing the right hand movement position indication and the left position in dotted outline.

Figure 4 shows the front view of the device with its hand at rest. This hand is used for showing the forward or straight ahead signal.

Figure 5 shows the device in position on an automobile with the signal in straight ahead position.

Similar reference characters refer to similar parts throughout the drawings.

In the construction shown, 1 represents an automobile of conventional outline having its mudguard 2 arranged to receive the indicator 3. This indicator consists of a box or casing having four hands with their mechanism. One of these hands is placed on the front 4 of the casing, and normally is swung back on the face out of the way. This hand 5 is attached to a hinge 6 that is supported on the face of the casing. A handle 7 is attached to the hinge, and to the handle is connected a rod 8 for pulling or pushing the handle and turning the hand either out in "ahead" direction or in the neutral position against the face. In other words it swings the hinged hand out or in as required. A further detail of the mechanism appears not to be necessary provided it causes a necessary reciprocation of the handle.

Figure 2 shows the construction pointing to the right. The hand 9 is of a conventional pointing hand design having a slotted base 10 adapted to permit the rivets 11 slide as the tongs 12 are pinched or open and without binding. The tongs are fulcrumed on a rivet 13, and one of them connects with a bar 14 loosely on a rivet connection 15. A link 16 connects from the last mentioned rivet and connects with a second link 17 that has its end attached to end of the other tong. This connection with the second link is made at a rivet 18 disposed near one end of the second link, the remaining portion of the end of this link being given a slight bent form to avoid certain binding stresses in operation. At the end 19 of this link a third link 20 is attached and loosely pivoted, and brought to a swinging arm 21 and attached thereto at the rivet 22. At the connection of the tong and link 16 and bar 14 a connection is made that serves to control the movement of this tong, the other end 23 of the bar being connected with the swinging arm so that the movement of the same will pull or space the ends of the tongs and make them pull in or extend the hand 9 into or out of the casing of the device. The swinging arm is operated by a rod mechanism 24 from the vehicle, the rod being in one piece or in such like as the construction and position of the vehicle requires. The general operation and position of the parts of this mechanism is clearly shown in the drawings. The left hand construction is similar except that the parts are turned in the opposite position.

Figure 1 shows the construction of the stop signal. Its hand 31 is open preferably, it has its slotted base 32, and it has its tongs 33 and 34 together with a bar 35 and links 36 and 27. The swinging arm is modified into a four linked member having toggle members 38 and 39 and links 40 and 41. The toggle 38 is pivotly on a stationary pivot 42 and link 41 on pivot 48. A rod mechanism 43 operates the whole mechanism by being operated up and down.

The various hands are placed in separate compartments of the casing and the mechanism mounted on the wall of one side of the compartment in each case. The various walls are held together with screw bolts or the like and serve to permit ready access to the interior or the separation of the parts for repair or inspection.

A mirror 49 is secured to the rear of the casing and a light 44 is placed on top to reflect the light on the various hands at night. The manner of linking up the mechanism to the car can be by rod or chain, and come to a common board in the car for the operator to use. Such has not been shown or specifically except conventionally in Figure 5 as it is believed that such construction can be readily understood by anyone skilled in the art.

The general operation of the device after the casing with its stand, is mounted on the mud guard is for the operator to pull or push on the respective mechanism that control the hand that indicates the proposed position or direction of the car or vehicle. This operation will in its different turns, make the stop hand move quickly up as shown in Figure 1, or in right hand position as shown in Figure 2 and ahead as in Figure 5. The hands being constructed in a pointing position for the sides and front, and open wide in the stop. This arrangement is the natural positions of the hands and itself explanatory.

The tong arrangement is not only strong but it is quick and enables the hands to close out of the way in the casing in a very small space. It is positive and affords an arrangement that is not susceptible to get out of order. It is of a unit type so that its parts may be readily made and assembled and it can be placed on that portion of the vehicle where it will be most evident to the passer-by. It keeps the signal off the body of the car rendering it more easily noted when in action.

While but one form of the invention is shown in the drawings it is not desired to limit this application for patent to this particular form or in any other way otherwise than limited by the prior art as many modifications in the construction of this invention could be made without departing from the scope of the claim.

I claim:

A device of the class described comprising in combination, a casing have a plurality of vertical compartments, said compartments having slots in the casing aligned with them, a plurality of hand signals in each of the compartments, one being arranged for stop signal, another for go signal, another for left turn signal and another for right turn signal, each hand being adapted to project through its respective slot from its compartment, a toggle mechanism in the respective compartment of each hand adapted to give it a movement sufficient to bring just the hand beyond the casing in a straightline movement with such mechanism within the compartment, and links extending beyond the casing, and operating parts for pulling on the links and casing the respective hand to signal substantially as described.

In testimony whereof I have affixed my signature, in presence of two witnesses.

GEORGE FERFELIS.

Witnesses:
MICHAEL J. GRIFFIN,
PETER FERFELIS.